United States Patent
Danilchenko et al.

(10) Patent No.: US 11,711,428 B2
(45) Date of Patent: Jul. 25, 2023

(54) IOT LICENSING PLATFORM AND ARCHITECTURE

(71) Applicant: Schneider Electric USA, Inc., Andover, MA (US)

(72) Inventors: Victor Danilchenko, South Hadley, MA (US); Daniel Cohen, Newtonville, MA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/745,102

(22) Filed: May 16, 2022

(65) Prior Publication Data
US 2023/0026311 A1    Jan. 26, 2023

Related U.S. Application Data

(63) Continuation of application No. 17/385,595, filed on Jul. 26, 2021, now Pat. No. 11,336,732.

(51) Int. Cl.
*H04L 67/12* (2022.01)
*G16Y 40/10* (2020.01)
*G16Y 40/35* (2020.01)
*H04L 67/1095* (2022.01)

(52) U.S. Cl.
CPC .............. *H04L 67/12* (2013.01); *G16Y 40/10* (2020.01); *G16Y 40/35* (2020.01); *H04L 67/1095* (2013.01)

(58) Field of Classification Search
CPC ........ G16Y 40/10; G16Y 40/35; H04L 67/12; H04L 67/1095
See application file for complete search history.

(56) References Cited

U.S. PATENT DOCUMENTS

| | | |
|---|---|---|
| 2013/0160146 A1 | 6/2013 | Kaiser et al. |
| 2017/0032378 A1* | 2/2017 | Ciszewski ............ G06Q 30/018 |
| 2018/0054472 A1* | 2/2018 | Greenspan .............. H04L 67/10 |
| 2020/0177554 A1 | 6/2020 | Moore |
| 2020/0210918 A1* | 7/2020 | Brand ................ G06Q 30/0205 |
| 2020/0220790 A1* | 7/2020 | Gopireddy .............. H04L 41/20 |
| 2020/0259896 A1 | 8/2020 | Sachs et al. |
| 2020/0272472 A1 | 8/2020 | Cella |
| 2020/0285788 A1* | 9/2020 | Brebner .............. G06F 18/2431 |
| 2020/0349238 A1* | 11/2020 | Tyagi ....................... G06F 16/22 |
| 2021/0182996 A1 | 6/2021 | Cella et al. |
| 2021/0382928 A1 | 12/2021 | Danilchenko et al. |

OTHER PUBLICATIONS

Extended European Search Report dated Dec. 7, 2022 for corresponding European Patent Application No. 22183371.8-1218, 9 pages.

* cited by examiner

*Primary Examiner* — Christopher B Robinson
(74) *Attorney, Agent, or Firm* — Locke Lord LLP

(57) ABSTRACT

Techniques are described for managing licenses of Internet of Things devices. One embodiment includes receiving, at a network management system, a request to allocate a license to a first endpoint device. Real-time device metadata and state data for the first endpoint device are accessed. Embodiments select a license instance, from a plurality of license instances, to allocate to the first endpoint device, based at least in part on the real-time device metadata and state data for the first endpoint device. The selected license instance is assigned to the first endpoint device and at least an indication that a valid license has been assigned to the first endpoint device is transmitted to the first endpoint device.

18 Claims, 5 Drawing Sheets

IOT LICENSING PLATFORM AND ARCHITECTURE

CROSS REFERENCE TO RELATED APPLICATION

This application is a continuation of U.S. patent application Ser. No. 17/385,595, filed on Jul. 26, 2021, the entire contents of which are incorporated by reference herein in their entirety.

TECHNICAL FIELD

The present disclosure relates to electronic device security, and more particularly, to techniques for managing licenses for Internet of Things (IoT) networks using an IoT Network Management System.

BACKGROUND

IoT networks deliver great value with highly available data and computing resources. However, such networks also bring significant security and privacy challenges. Many times, IoT devices are managed (from both a security and cost perspective) using digital licenses. However, deploying licensing management logic onto IoT devices can be problematic, in part because typically IoT devices have limited computing resources that can quickly be exhausted when both IoT control logic and licensing management logic are loaded onto the device.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
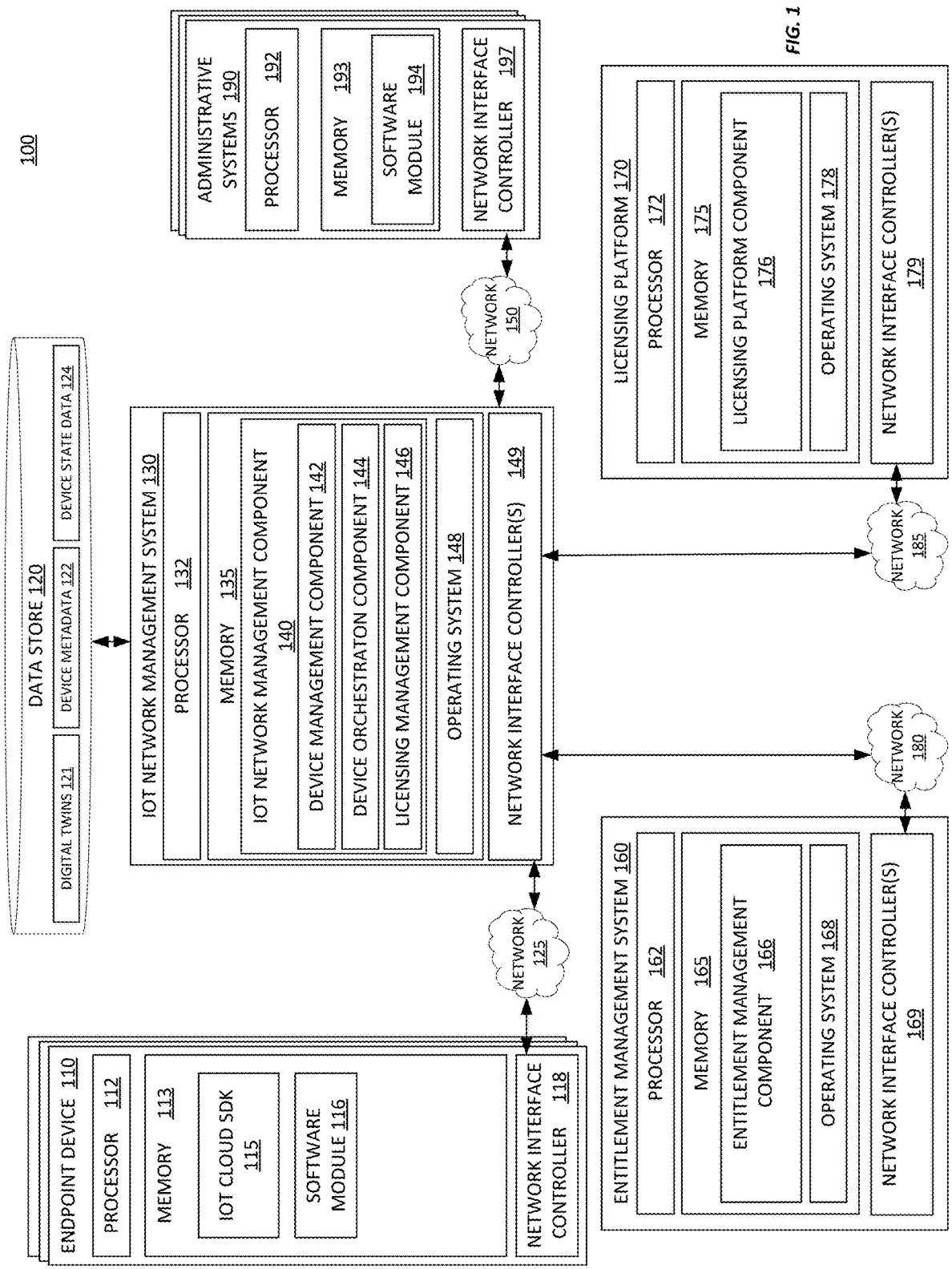
FIG. 1 illustrates a system configured with an IoT Network Management Component, according to one embodiment described herein.

Internet of Things (IoT) networks deliver great value with seemingly omnipresent data and compute resources, yet also can pose significant challenges to security and privacy. Generally speaking, IoT systems bring pervasive computing to everyday life. Anything from a smart thermostat or a fridge to a smart assembly line or refinery safety equipment can be connected to the Internet, delivering tremendous value in the form of both data and control capabilities. IoT data is becoming increasingly valuable, and generally the value of this data is unlocked largely through analytics. The analytics value cascade generally includes descriptive analytics that, e.g., describe what is happening, diagnostic analytics that, e.g., give details on malfunctions, predictive analytics that, e.g., can suggest maintenance before a malfunction occurs, prescriptive analytics that, e.g., can suggest changes to avoid before a malfunction occurs, and productive analytics that can, e.g., suggest how to improve a product and production.

However, the "value" of data is not a singular quantity, and generally the true value of data depends on the context. For example, for a given embodiment, the value of collected data can depend on the production of the data, the usage of the data, the need or demand for the data, the available supply of data, and so on. In many environments today, the value of the data exists but has yet to be unlocked. While much of the value of data can be unlocked within an offer or product context, a vast potential value also exists in relating various heterogeneous bodies of data to each other—across offers, across domains, across administrative boundaries, etc.

Today, IoT devices are typically configured with a licensing software development kit (SDK) that runs locally on the IoT devices. The licensing SDK can communicate with a licensing orchestration service, which in turn can communicate with an entitlement platform that manages costs for bundles of licenses within the IoT environment and a licensing platform that originally grants and manages the licenses within the IoT environment. Likewise, conventional IoT devices are also configured with a separate IoT cloud platform SDK, which communicates with an IoT cloud platform that manages the behavior and functionality of the IoT device.

One challenge that such an approach presents is that it requires sufficient computing resources on IoT devices to run both the licensing SDK and the separate IoT cloud platform SDK. As many IoT devices are significantly constrained on the amount of computing resources they have (e.g., due to cost controlling measures that limit the amount of computing resources on devices to keep the costs of the device down, due to the device being a legacy device, etc.), running both SDKs may be impossible for some IoT devices due to a lack of computing resources or the IoT devices may need to run a version of the IoT cloud platform SDK that is reduced in size/functionality to stay within the computing resources available on the IoT device.

Many devices today are managed through the use of a digital twin. Generally, a digital twin is a virtual representation of a physical device. Data (e.g., real-time sensor data, device state data, etc.) can flow from the physical device to its corresponding digital twin, and computer logic can process this data to update the state of the digital twin accordingly. In many instances, users and monitoring processes can view the attributes of the digital twin to monitor the physical device, rather than querying the physical device itself. For example, to see what state a particular device is in, a user could query the state of the corresponding digital twin to determine the current state of the digital twin, which will likely match the state of the physical device provided the physical device sends real-time updates to its corresponding digital twin.

A particular embodiment described herein provides a method for managing IoT devices. The method includes receiving, at a network management system, a request to allocate a license to a first endpoint device (e.g., an IoT device). The network management system can access real-time device metadata and state data for the first endpoint device and can select a license instance, from a plurality of license instances, to allocate to the first endpoint device, based at least in part on the real-time device metadata and state data for the first endpoint device. The network management system assigns the selected license instance to the first endpoint device. In doing so, the network management system provides, to the first endpoint device, at least an indication that a valid license has been assigned to the first endpoint device.

In one embodiment, the network management system is configured to assign the selected license instance to the first endpoint device. In doing so, the network management system can set a value within a digital twin corresponding to the first endpoint device, indicating that a valid license has been assigned to the first endpoint device. The digital twin can then push out the set value (e.g., a binary or Boolean value) to the first endpoint device, thereby notifying the first endpoint device that a valid license has been assigned to the first endpoint device. In such an embodiment, the first endpoint device does not need to run a licensing SDK beyond a simple check of an incoming binary value indicating whether a valid license has been assigned. That is, in such an embodiment, the licensing management logic has essentially been moved from the endpoint device and into the network management system (e.g., which may execute on a remote server or in cloud computing environment). Doing so frees up computing resources on the endpoint device relative to conventional endpoint device configurations, and enables licensing capability for even severely constrained devices (i.e., constrained in terms of computing resources).

FIG. 1 illustrates a system configured with an access management component, according to one embodiment described herein. As shown, the system 100 includes Endpoint Devices 110 and a Data Orchestrator System 130, interconnected via a network 125, and the IoT Network Management System 130 and Consumers 190, interconnected via a network 150. Additionally, the system 100 depicts the IoT Network Management System 130 connected to an Entitlement Management System 160 via network 180, and further connected to the licensing platform 170 via network 185. Generally, the networks 125, 150, 180 and 185 represent any suitable data communications networks, with examples including (without limitation) a local area network (LAN), a wide area network (WAN), an IEEE 802.11 wireless network, and so on. Moreover, the networks 125, 150, 180 and 185 may be the same type of data communication network or may be different types of data communications network, relative to one another.

The Endpoint Devices 110 include one or more computer processors 112, a memory 113 and a network interface controller 118. The memory includes IoT firmware 114, which in turn includes an IoT Cloud Platform SDK 115, a software module 116 and an operating system 117. Generally, the IoT Cloud Platform SDK 115 represents logic for interfacing with the IoT Network Management System 130. For example, the IoT Cloud Platform SDK 115 can include logic for transmitting data (e.g., sensor data from one or more sensor devices on the endpoint device 110) to the IoT Network Management System 130 (e.g., using a publish/subscribe model, by providing an Application Programming Interface (API) through which the IoT Network Management System 130 can pull data upon request, or more generally through any suitable communication schema). As another example, the IoT Cloud Platform SDK 115 can interface with the IoT Network Management System 130 to control the functionality of the endpoint device 110. For instance, the IoT Network Management System 130 could transmit a command to the IoT Cloud Platform SDK 115, instructing the endpoint device 110 to perform a particular predefined operation. Such a request could include one or more parameters relating to the request. For example, where the endpoint device 110 comprises a robotic vacuum cleaner device, the IoT Network Management System 130 could transmit an instruction to the IoT Cloud Platform SDK 115 specifying to initiate performance of a vacuuming operation and specifying one or more parameters indicating an area in which to perform the vacuuming operation. The operating system 117 represents any suitable operating system for a computing device.

The IoT Network Management System 130 includes one or more computer processors 132, a memory 135, and a network interface controller 149. The memory 135 contains an IoT Network Management Component 140 and an operating system 148. Generally, the IoT Network Management Component 140 represents software logic that manages the functionality, monitoring and licensing of the endpoint devices 110. In doing so, the IoT Network Management Component 140 can maintain a respective digital twin 121 corresponding to each of the endpoint devices 110. Generally, the operating system 138 represents any suitable operating system for a computing device. IoT Network Management System 130 is communicatively coupled to a data store 120.

The Administrative Systems 190 includes one or more computer processors 192, a memory 193 and a network interface controller 197. The memory 193 includes a software module 194. Additionally, the Entitlement Management System 160 includes one or more computer processors 162, a memory 165 and a network interface controller 169. The memory 165 includes an Entitlement Management Component 166 and an operating system 168. Generally, the Entitlement Management Component 166 is configured to manage groups of resources, the procurement of such resources, the pricing and billing for procuring such resources, and so on. For example, the Entitlement Management Component 166 could manage the pricing and billing for bundles of licenses for use on the endpoint devices 110. The operating system 168 represents any suitable operating system for a computing device.

The Licensing Platform System includes one or more computer processors 172, a memory 176 and a network interface controller. The memory 175 includes a Licensing Platform Component 176 and an operating system 178. Generally, the Licensing Platform Component 176 is configured to manage the creation and expiration of individual digital licenses (e.g., for use with the endpoint devices 110). The operating system 178 represents any suitable operating system for a computing device.

The Endpoint Devices each include a processor 112, memory 113, and network controller 118. The IoT Network Management System 130 contains a processor 132, memory 135 and network interface controller(s) 149. The Administrative Systems 190 each include a processor 192, memory 193 and a network interface controller 197. The Entitlement Management System 160 contains a processor 162, a memory 165 and a network interface controller 169. The Licensing Platform 170 includes one or more computer processors 172, a memory 175 and network interface controller 179. Any general-purpose computer systems used in various embodiments of this disclosure may be, for example, general-purpose computers with general-purpose computer processors. For example, the processors 112, 132, 162, 172 and 192 may include processors based on Intel PENTIUM-type processor, Motorola PowerPC, Sun UltraSPARC, Hewlett-Packard PA-RISC processors, ARM-based processors or any other type of processor. Generally, the processors 112, 132, 162, 172 and 192 represent any suitable processor(s), including commercially available processors such as the well-known Pentium class processor available from the Intel Corporation. Many other processors are available. Such a processor usually executes an operating system (e.g., the processor 132 can execute the operating system 148, the processor 162 can execute the operating system 168, etc.) which may be, for example and without limitation, Microsoft® Windows®, Apple® macOS®, Solaris®, UNIX®, or Linux®. Many other operating systems may be used.

The memories 113, 135, 165, 175 and 193 generally represents any suitable form of addressable computer memory. For example, the memories 113, 135, 165, 175 and 193 may represent a volatile memory (e.g., static random-access memory (SRAM)) and/or a non-volatile memory (e.g., Flash memory). More generally, any suitable form of memory device(s) can be used, consistent with the functionality described herein. Generally, the processor and operating system together define a computer platform for which application programs in high-level programming languages are written. It should be understood that embodiments of the present disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

In the depicted embodiment, the memories 113 and 193 contain software modules 116 and 194, respectively. In one embodiment, the memory 113 can further contain a data collection component (not shown) that is generally configured to collect data for a data metric(s) on the endpoint devices 110. For example, in a power management context, the data collection component could collect power metric data from one or more sensor devices (not shown) of the endpoint devices. Generally, the software modules 116 and 194 represent application-specific software for the IoT environment. For example, in a power management context, the software modules 116 on the endpoint devices 110 could include power monitoring logic, while the software modules 194 could include power metric processing logic and monitoring and analytics services.

The Endpoint Devices 110, IoT Network Management System 130, Entitlement Management System 160, Licensing Platform 170 and Administrative Systems 190 may use the network interface controllers 118, 149, 169, 179 and 197, respectively, to send and receive data on one or more data communication networks (e.g., networks 125, 150, 180 and 185). One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

As shown, the memory 135 also contains an operating system 138. Similarly, the memories 165 and 175 contain operating systems 168 and 178, respectively. Generally, the operating systems 148, 168 and 178 manage at least a portion of the hardware elements included in IoT Network Management System 130, Entitlement Management System 160 and Licensing Platform 170, respectively. Usually, a processor or controller, such as processors 132 and 162, executes an operating system which may be, for example, a Windows-based operating system, such as, Windows 10, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

In the depicted embodiment, the IoT Network Management Component 140 includes a Device Management Component 142, a Device Orchestration Component 144 and a Licensing Management Component 146. Generally, the Device Management Component 142 is configured with managing the endpoint devices 110, for example, managing the operation of the endpoint devices 110, maintaining device state data 124 describing a real-time state of each of the endpoint devices 110, maintaining digital twins 132 for the endpoint devices 110, and collecting and maintaining device metadata 122 describing various attributes of the endpoint devices (e.g., a battery level for a particular endpoint device).

The Device Orchestration Component 144 generally represents computer logic for organizing groups of endpoint devices 110, e.g., to perform a particular task. For example, where the Endpoint Devices 110 include a group of robotic vacuum cleaner devices, the Device Orchestration Component 144 could manage the group of devices to perform the task of cleaning a particular area of a building. In doing so, the Device Orchestration Component 144 can consider the device state data 124, the device metadata 122 and attributes of the digital twins 121 corresponding to the devices in the group of devices to select specific endpoint devices 110 to carry out portions of the task. For example, if a first endpoint device 110 is closest to the particular area of the building but the digital twin 121 corresponding to the first endpoint device 110 indicates that the first endpoint device 110 is currently low on battery power, the Device Orchestration Component 144 could select a second endpoint device 110 that is further away but that has higher battery power (as indicated by the second endpoint device's corresponding digital twin 121) to assist in performing the task.

The licensing management component 146 generally represents software logic that interfaces with the entitlement management system 160 and the licensing platform 170 to obtain and maintain licenses for the endpoint devices. In doing so, the licensing management component 146 could transmit a request to the licensing platform component 176 to request the instantiation of a new digital license for a particular endpoint device 110. The licensing platform component 176 can perform one or more validations on the request (e.g., confirming that the licensing management component 146 is associated with an account in good standing, confirming that the licensing management component 146 is associated with an account that is authorized to request new licenses, etc.) and upon successfully validating the request, the licensing management component 146 could generate and transmit a new digital license to the licensing management component 146. In doing so, the licensing management component 146 could also transmit one or more network messages to the entitlement management component 166, notifying the entitlement management component 166 of the creation of the new license. In response, the entitlement management component 166 could add a representation of the new license to a bundle of licenses held by an account associated with the IoT Network Management Component 140 and can update pricing/billing data for the account to factor in the new license.

When the device orchestration component 144 selects a particular Endpoint Device 110 to perform at least a portion of a new task, the device orchestration component 144 could confirm whether a valid license is currently assigned to the selected particular endpoint device 110. For example, the device orchestration component 144 could query the digital twin 121 corresponding to the particular endpoint device 110 to confirm whether a value is set within the digital twin that indicates that a valid license is currently assigned to the selected endpoint device. In some embodiments, multiple different types of licenses may be used (e.g., for different operations, for different types of devices, etc.). In such an embodiment, the device orchestration component 144 could determine one or more particular types of licenses that are defined as required to perform the at least a portion of the new task, and the device orchestration component 144 could query one of multiple values within the digital twin that corresponds to the particular type of license(s) needed to perform the at least a portion of the new task.

If the device orchestration component 144 determines that no valid license is currently assigned to the particular endpoint device 110, the device orchestration component 144 could transmit a request to the licensing management component 146, requesting that a license be assigned to the particular endpoint device 110. In response, the licensing management component 146 could access one or more predefined rules for obtaining a license for the particular endpoint device. Such rules could be defined, for example, by a network administrator via a software module 194 of an administrative system 190. For instance, in some circumstances, such rules could specify to request and procure a new license from the licensing platform component 176 and to assign this new license to the particular endpoint device. In such an embodiment, the licensing management component 146 could transmit a request for a new license to the licensing platform component 176 and upon obtaining the new license, the licensing management component 146 could update the digital twin 121 corresponding to the particular endpoint device accordingly to indicate that the new license is assigned to the particular endpoint device.

As another example, the licensing management component 146 could determine that an existing license is currently unassigned and the existing license is suitable for assigning to the particular endpoint device (e.g., based on the terms and/or requirements associated with the existing license). In such a circumstance, the licensing management component 146 could assign the existing license to the particular endpoint device and could update the digital twin 121 corresponding to the particular endpoint device accordingly.

In some cases, the licensing management component 146 may determine that no suitable unassigned licenses are currently available and could further determine to re-assign a particular license from a different endpoint device to the particular endpoint device. For example, where the different endpoint device is currently low on battery power and is in a state of recharging its battery, the licensing management component 146 could unassign a license from the different endpoint device and could assign this license instead to the particular endpoint device. The licensing management component 146 could update the digital twin 121 corresponding to the particular endpoint device accordingly, indicating that the license has been unassigned from the different endpoint device and instead assigned to the particular endpoint device.

Upon validating that the particular endpoint device 110 has a valid license and/or upon assigning a valid license to the particular endpoint device, he device orchestration component 144 could relay this information to the device management component 142, which in response could instruct the digital twin 121 corresponding to the particular endpoint device 110 to perform an operation corresponding to the portion of the new task. In turn, the instruction to perform the portion of the new task could be transmitted to the IoT Cloud Platform SDK 115 of the particular endpoint device 110, e.g., by the device management component 142, via the digital twin 121, etc.

Additionally, the device management component 142 could perform a look-up operation in the digital twin 121 corresponding to the endpoint device to determine whether a valid license is currently held by the particular endpoint device 110 and could transmit a Boolean value to the IoT Cloud Platform SDK 115 of the particular endpoint device 110 representing the result of this determination. The IoT Cloud Platform SDK 115, upon receiving the instruction to perform the operation, could verify that the received Boolean value indicates that a valid license is assigned to the particular endpoint device 110 before beginning performance of the operation. Advantageously, by doing so, the system 100 can securely and accurately manage the assignment of licenses to the various endpoint devices 110, while allowing the endpoint devices 110 to forego running a fully functional licensing SDK, thereby conserving the computing resources of the endpoint devices 110.

Figure 2:
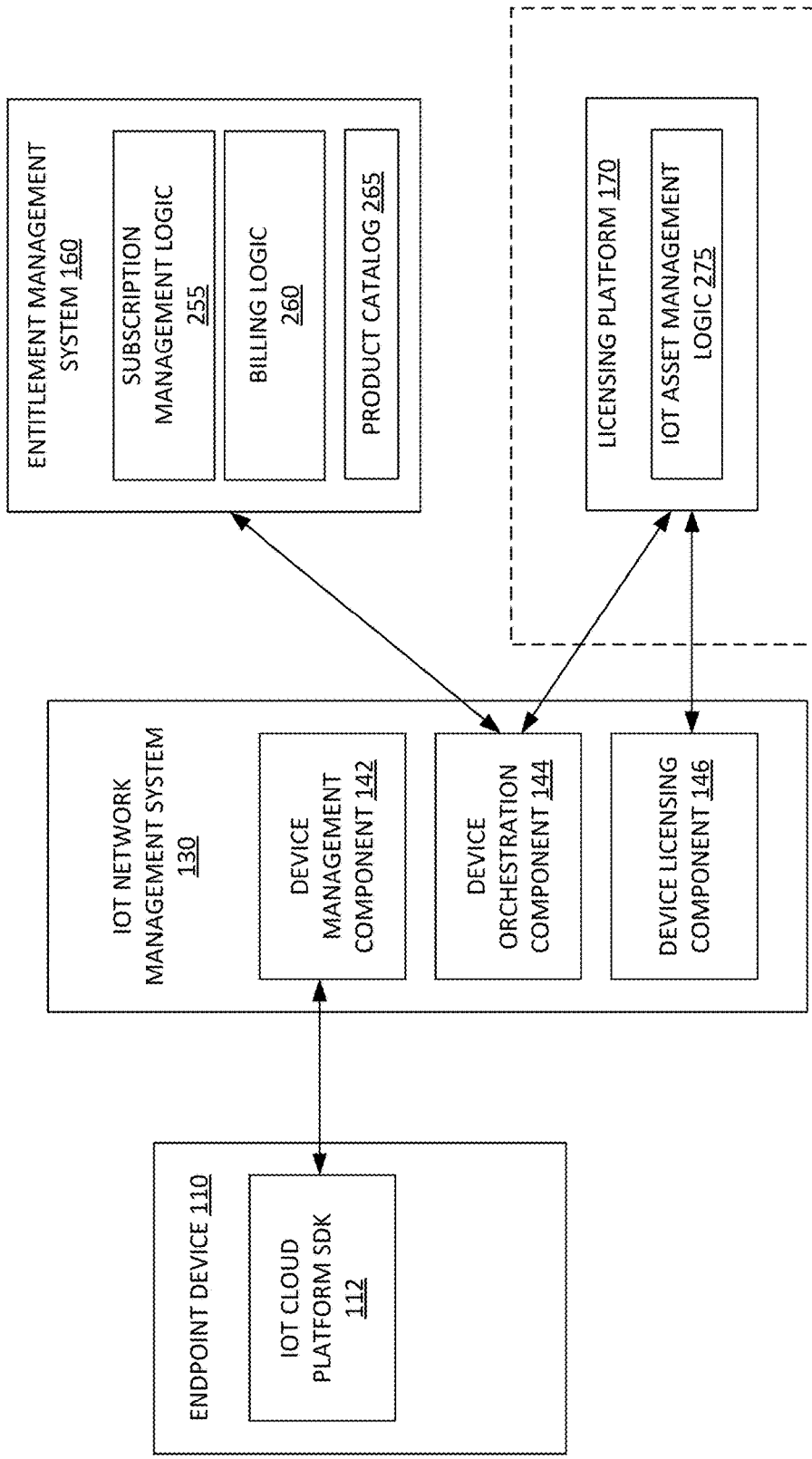
FIG. 2 is a block diagram illustrating a system configured with a combined IoT management and cloud licensing platform, according to one embodiment described herein.

FIG. 2 is a block diagram illustrating a system configured with a combined IoT management and cloud licensing platform 210, according to one embodiment described herein. As shown, the system 200 includes an endpoint device 110, the IoT Network Management System 130, the Entitlement Management System 160 and the Licensing Platform 170. In the depicted embodiment, the IoT Cloud Platform SDK 112 executing on the endpoint device 110 is configured to communicate with the Device Management Logic executing on the IoT Network Management System 130. Such communications can include, for illustrative purposes only and without limitation, the transmission of data (e.g., state data, device metadata, collected sensor data, etc.) from the endpoint device 110 to the IoT Network Management System 130, the transmission of commands from the device management logic 142 to the IoT Cloud Platform SDK 112 instructing the endpoint device 110 to perform a particular operation, and so on.

In the depicted embodiment, the orchestration logic 144 is configured to communicate with both the entitlement management system 160 and the licensing platform 170. For example, the orchestration logic 144 could be configured with predefined rules for determining how and when to obtain new licenses for endpoint devices. In evaluating such rules, the orchestration logic 144 could query the subscription management logic 255 of the entitlement management system 160 to request pricing data from the product catalog 265 maintained on the entitlement management system 160.

Upon evaluating the predefined rules and determining to procure a new license, the licensing logic 146 could transmit a request for a new license to the IoT Asset Management Logic 275 of the licensing platform 170. The IoT Asset Management Logic 275 could instantiate the new digital license and could transmit the new digital license to the licensing logic 146. The orchestration logic 144 could associate the new digital license with the endpoint device 110 and could transmit notifications to the entitlement management system 160 and the licensing platform 170, indicating that the new license has been assigned to the endpoint device 110. In response, the billing logic 260 of the entitlement management system 160 could adjust a bill for the IoT network management system 130 based on pricing data for the new digital license defined by the product catalog 265.

Once the new license is assigned to the endpoint device 110, the device management logic 142 could transmit an instruction specifying to perform a particular operation to the IoT Cloud Platform SDK 112 of the endpoint device 110. In transmitting such an instruction, the device management logic 142 could include a Boolean value indicating whether a valid license has been assigned to the endpoint device 110. The IoT Cloud Platform SDK 112 could evaluate this Boolean value to confirm that a valid license is assigned to the endpoint device 110 before performing the specified operation.

In a particular embodiment, the IoT Network Management System 130 is configured to communicate only with the Entitlement Management System 160, as indicated by the dashed lines around the Licensing Platform 170. In such an embodiment, the device licensing component 146 can communicate with the subscription management logic 255 of the entitlement management system 160 to ensure that the authorized number and types of entitlements allotted to a particular IoT customer are not exceeded. In such an embodiment, the device licensing component 146 and/or the subscription management logic 255 may maintain a mapping of each entitlement to a particular device, but may not generate a digital license object (e.g., comprising a cryptographic token(s)), as the IoT Network Management System 130 is implementing the licensing logic and is a trusted system within the IoT environment.

Figure 3:
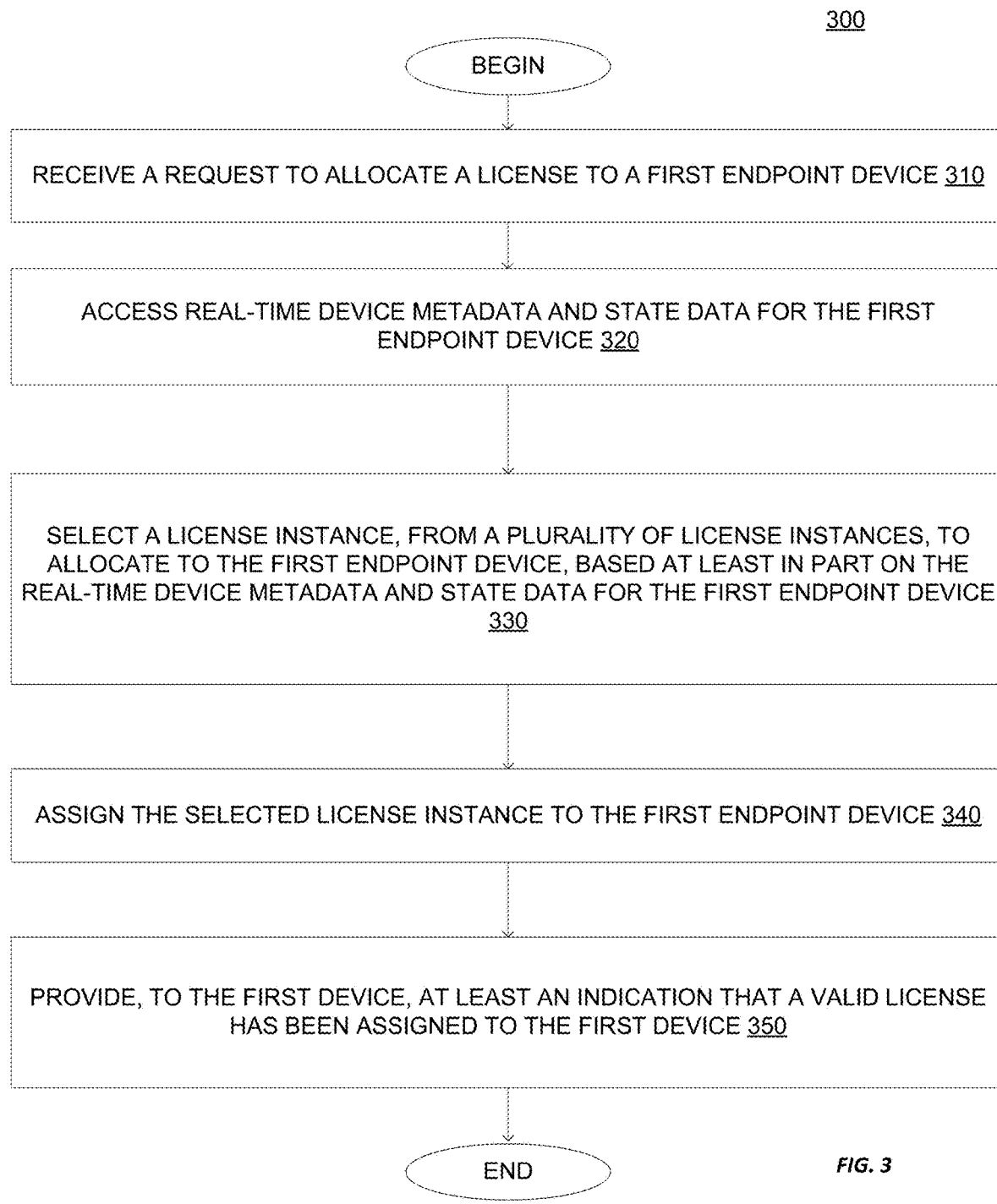
FIG. 3 is a flow diagram, illustrating a method of managing licenses for endpoint devices within a computing environment, according to one embodiment described herein.

FIG. 3 is a flow diagram, illustrating a method of managing data access within a first computing environment. As shown, the method 300 begins at block 310, where the IoT Network Management System 140 receives a request to allocate a license to a first endpoint device. The IoT Network Management System 140 accesses real-time device metadata and state data for the first endpoint device (block 320). The IoT Network Management System 140 selects a license instance, from a plurality of license instances, to allocate to the first endpoint device, based at least in part on the real-time device metadata and state data for the first endpoint device (block 330).

At block 340, the IoT Network Management System 140 assigns the selected license instance to the first endpoint device. In doing so, the IoT Network Management System 140 can update the digital twin 121 corresponding to the first endpoint device, indicating that the selected license instance has been assigned to the first endpoint device. The IoT Network Management System 140 provides, to the first endpoint device, at least an indication that a valid license has been assigned to the first endpoint device (block 350), and the method 300 ends. For example, the IoT Network Management System 140 could update a value within the corresponding digital twin 121, and a digital twin synchronization process could then be performed to transmit the updated value to the endpoint device, the updated value indicating that a valid license has been assigned to the first endpoint device.

Figure 4:
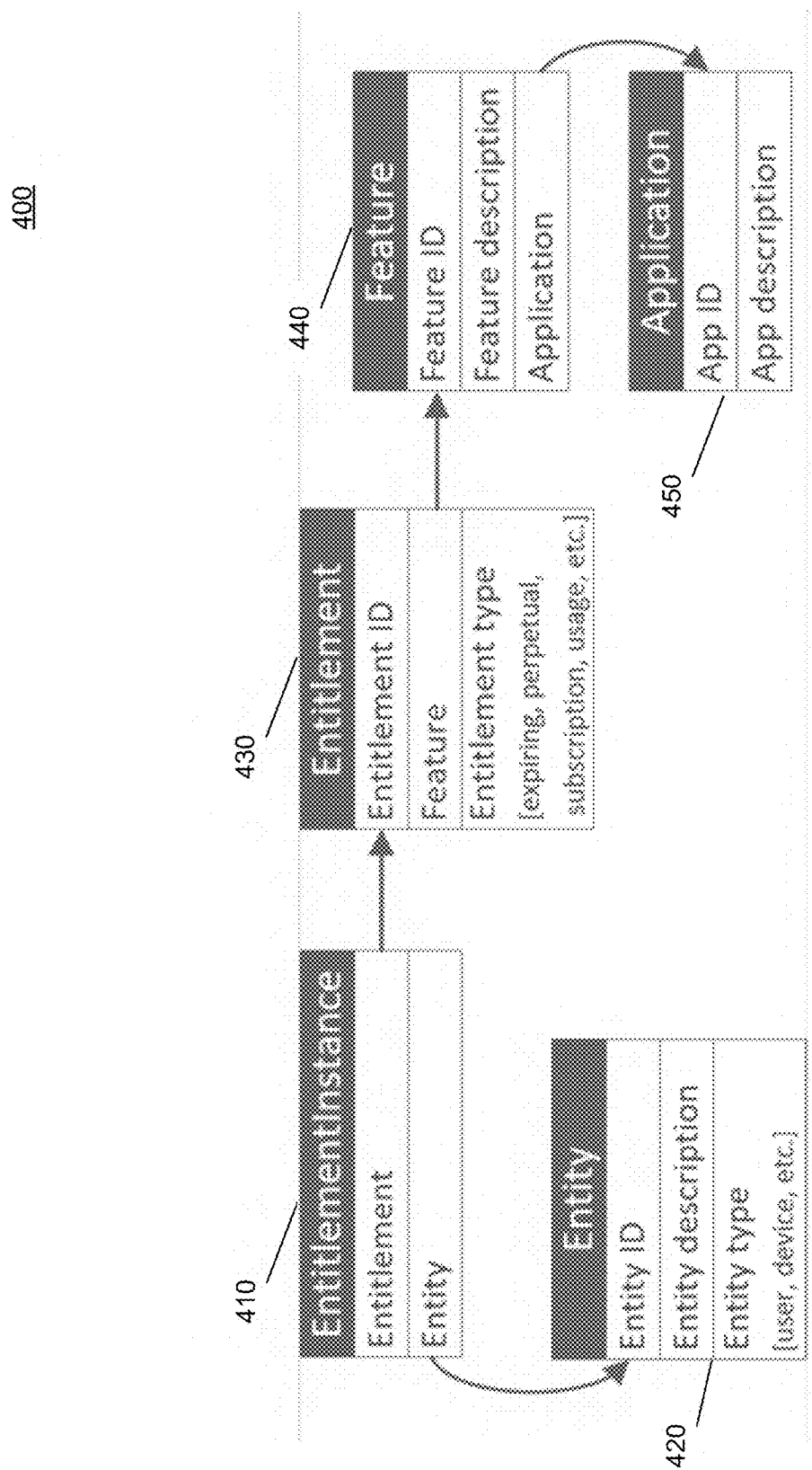
FIG. 4 is a diagram illustrating a data model for an IoT Network Management System, according to one embodiment described herein.

FIG. 4 is a diagram illustrating a data model for an IoT Network Management System, according to one embodiment described herein. As shown, the data model 400 includes an EntitlementInstance object 410 which includes an Entity object 420 and an Entitlement object 430. The Entity object 420 generally represents an entity within the IoT environment. In the depicted embodiment, the Entity object 420 defines an Entity ID which comprises a unique identifier associated with the entity, an Entity description value describing the entity, and a type value defining a type of entity (e.g., a user, a device, etc.). The Entitlement object 430 includes an Entitlement ID which comprises a unique identifier associated with the entitlement, a Feature object 440 and an Entitlement type value which defines a type of entitlement (e.g., an expiring entitlement, a perpetual entitlement, a subscription-based entitlement, a usage-based entitlement, etc.).

The Feature object 440 includes a Feature ID which comprises a unique identifier associated with the particular feature, a feature description that describes the feature, and an Application object 450. The Application object 450, in turn, contains an application ID which uniquely identifies the application in question and an application description which describes the application. In one embodiment, the IoT Network Management Component 140 is configured to maintain the data model 400 to represent the various entities, entitlements and so on within the IoT environment 100. Of course, the depicted data model 400 is simply one of many possible data models that could be used by an IoT Network Management component and is provided for illustrative purposes only and without limitation. More generally, any suitable data model can be used by the IoT network management component 140, consistent with the functionality described herein.

Figure 5:
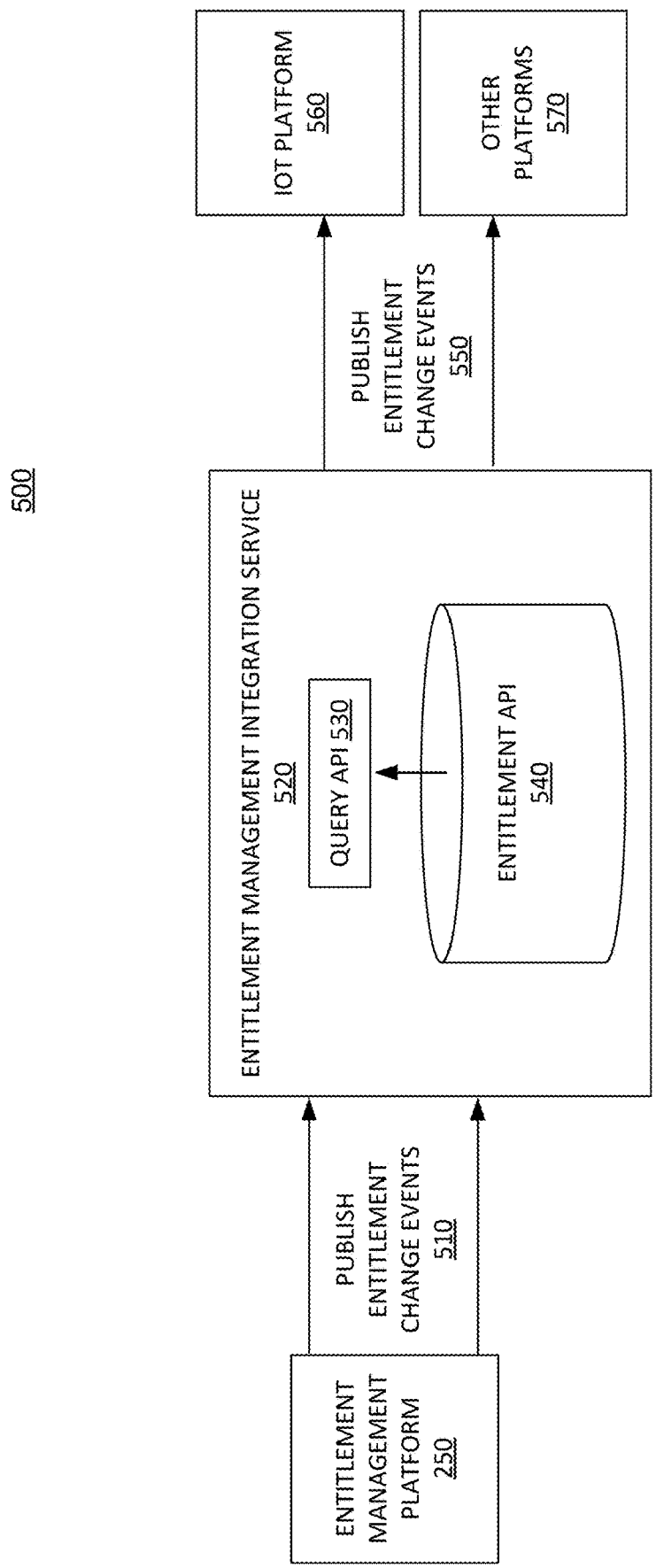
FIG. 5 is a block diagram illustrating a data flow for managing entitlements for endpoint devices within a computing environment, according to one embodiment described herein.

FIG. 5 is a block diagram illustrating a data flow for managing entitlements for endpoint devices within a computing environment, according to one embodiment described herein. More particularly, the system 500 includes an Entitlement Management Integration Service 520 which serves as an intermediary between the entitlement management platform 250 and an IoT platform 560 (e.g., the IoT Network Management System 130). As shown, the system 500 includes an entitlement management platform 250, an entitlement management integration service 520, an IoT platform 560 and one or more other platforms 570. In the depicted embodiment, the data flow begins with the entitlement management platform 250 publishing entitlement change events 510. For example, a customer of the entitlement management platform 250 could update the bundle of licenses they are currently paying for to increase the number of licenses that can be active at any point in time. In response, the entitlement management platform 250 could publish one or more entitlement change events to the entitlement management integration service, indicating the increase in the number of active licenses.

The entitlement management integration service 520, upon receiving the entitlement change event, could process the entitlement change event using the entitlement API 540. In doing so, the entitlement API 540 could update a data store maintained by the entitlement management integration service 520 that contains data describing various entitlements and attributes and metadata thereof. The entitlement management integration service 520 further provides a query API 530 through which authenticated and authorized users can request data on the current entitlements monitored by the entitlement management integration service 520.

Additionally, upon receiving the entitlement change events 510 from the entitlement management platform 250, the entitlement management integration service 520 can publish corresponding entitlement change events to the IoT Platform 560 and other platforms 570. For example, the IoT platform 560 could represent the IoT Network Management System 130 shown in FIG. 1 and described above. In such an embodiment, the entitlement management integration service 520 could sit between the entitlement management system 160 and the IoT Network Management System 130 and serves as an intermediary between the entitlement management system 160 and the IoT Network Management System 130. Advantageously, by doing so, the IoT platform 560 (e.g., the IoT Network Management System 130) can be configured to communicate with the entitlement management integration service 520, while the entitlement management integration service 520 can be configured to communicate with multiple different types of entitlement management platforms 250. In a particular embodiment, multiple instances of the entitlement management integration service 520 are provided, each configured to communicate with a different type of entitlement management platform 250. By doing so, the IoT platform 560 can be decoupled from any specific entitlement management platform 250 and can seamlessly switch between different entitlement management platforms 250 or potentially communicate with multiple different entitlement management platforms 250 at once.

As discussed above, embodiments provide an IoT licensing platform and architecture which shifts substantially all of the licensing logic from endpoint devices (e.g., IoT devices) to a IoT Network Management System 130 (e.g., executing in a cloud computing environment). In doing so, embodiments can leverage digital twins that represent the various endpoint devices to designate whether a particular endpoint device is licensed to perform a particular operation, and this designation can be communicated with the endpoint device via a digital twin synchronization process. Advantageously, doing so helps to ensure the endpoint devices are operating within the confines of their entitlements while conserving computing resources on the endpoint devices themselves that were previously needed to execute licensing logic.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method, comprising:
   receiving, at a network management system, a request to allocate a license to a first endpoint device;
   selecting a license instance, from a plurality of license instances, to allocate to the first endpoint device, based at least in part on real-time device metadata and state data for the first endpoint device;
   assigning the selected license instance to the first endpoint device comprising setting a value in a digital twin to indicate that a valid license has been assigned to the first endpoint device, wherein the digital twin comprises a digital representation of a current state of the first endpoint device, and
   wherein a digital twin synchronization operation is performed to transmit, to the first endpoint device, from the digital twin, a Boolean value indicating that the valid license has been assigned to the first endpoint device, and
   wherein the first endpoint device further comprises computer logic configured to determine that the valid license has been assigned to the first endpoint device based on the received Boolean value.

2. The method of claim 1, wherein the first endpoint device further comprises a first Internet of Things (IoT) device.

3. The method of claim 2, wherein selecting the license instance is further based on additional real-time device metadata and additional state data corresponding to one or more other endpoint devices within an IoT environment including the IoT device.

4. The method of claim 3, wherein selecting the license instance further comprises:
   determining a task to perform within the IoT environment;
   identifying a plurality of IoT devices, inclusive of the first IoT device, that are suitable for assisting in performing the determined task;
   selecting the first IoT device, from the plurality of IoT devices, based on the real-time device metadata and state data corresponding to the first IoT device and one or more predefined requirements associated with the determined task.

5. The method of claim 4, wherein selecting the license instance and assigning the selected license instance to the first IoT device are further based on the selection of the first IoT device, and further comprising:
   upon providing, to the first endpoint device, the at least an indication that the valid license has been assigned to the first endpoint device, transmitting one or more instructions to the first endpoint device instructing the first endpoint device to perform one or more actions involved in the performance of the determined task.

6. The method of claim 1, wherein selecting the license instance, from the plurality of license instances, to allocate to the first endpoint device, further comprises:
   transmitting one or more requests to at least one of an entitlement management system and a licensing platform, external to the network management system, to determine the plurality of license instances.

7. The method of claim 1, wherein the digital twin synchronization operation further comprises at least one of:
   pushing data from the digital twin to the first endpoint device whenever a state change event occurs for a variable of the digital twin,
   periodically transmit a set of changes values from the digital twin to the first endpoint device, and
   transmitting one or more values from the digital twin to the first endpoint device upon receiving a request from the first endpoint device.

8. The method of claim 1, wherein providing, to the first endpoint device, at least an indication that the valid license has been assigned to the first endpoint device further comprises transmitting license metadata describing expiration attributes corresponding to the assigned license, wherein the expiration attributes further comprise at least one of a duration of the valid license, a point in time at which the valid license will expire, and a number of operations that can be performed before the valid license will expire.

9. A system, comprising:
   one or more computer processors; and
   a memory containing computer program code that, when executed by operation of the one or more computer processors, performs an operation comprising:
      receiving, at a network management system, a request to allocate a license to a first endpoint device;
      selecting a license instance, from a plurality of license instances, to allocate to the first endpoint device, based at least in part on real-time device metadata and state data for the first endpoint device;
      assigning the selected license instance to the first endpoint device comprising setting a value in a digital twin to indicate that a valid license has been assigned to the first endpoint device, wherein the digital twin comprises a digital representation of a current state of the first endpoint device, and
      wherein a digital twin synchronization operation is performed to transmit, to the first endpoint device, from the digital twin, a Boolean value indicating that the valid license has been assigned to the first endpoint device, and
      wherein the first endpoint device further comprises computer logic configured to determine that the valid license has been assigned to the first endpoint device based on the received Boolean value.

10. The system of claim 9, wherein the first endpoint device further comprises a first Internet of Things (IoT) device.

11. The system of claim 10, wherein selecting the license instance is further based on additional real-time device metadata and additional state data corresponding to one or more other endpoint devices within an IoT environment including the IoT device.

12. The system of claim 11, wherein selecting the license instance further comprises:
   determining a task to perform within the IoT environment;
   identifying a plurality of IoT devices, inclusive of the first IoT device, that are suitable for assisting in performing the determined task;
   selecting the first IoT device, from the plurality of IoT devices, based on the real-time device metadata and state data corresponding to the first IoT device and one or more predefined requirements associated with the determined task.

13. The system of claim 12, wherein selecting the license instance and assigning the selected license instance to the first IoT device are further based on the selection of the first IoT device, and further comprising:
   upon providing, to the first endpoint device, the at least an indication that the valid license has been assigned to the first endpoint device, transmitting one or more instructions to the first endpoint device instructing the first endpoint device to perform one or more actions involved in the performance of the determined task.

14. The system of claim 9, wherein selecting the license instance, from the plurality of license instances, to allocate to the first endpoint device, further comprises:
   transmitting one or more requests to at least one of an entitlement management system and a licensing platform, external to the network management system, to determine the plurality of license instances.

15. The system of claim 9, further comprising:
   maintaining, by the network management system, a digital twin comprising a data model that digitally represents the first endpoint device,
   wherein assigning the selected license instance to the first endpoint device further comprises setting a value in the digital twin representing that a valid license instance has been assigned to the first endpoint device, and
   wherein once the at least an indication that a valid license has been assigned to the first endpoint device is provided to the digital twin, the set value in the digital twin is transmitted to the first endpoint device using a digital twin synchronization process.

16. The system of claim 15, wherein the digital twin synchronization process further comprises at least one of:
   pushing data from the digital twin to the first endpoint device whenever a state change event occurs for a variable of the digital twin,
   periodically transmit a set of changes values from the digital twin to the first endpoint device, and
   transmitting one or more values from the digital twin to the first endpoint device upon receiving a request from the first endpoint device.

17. The system of claim 9, wherein providing, to the first endpoint device, at least an indication that the valid license has been assigned to the first endpoint device further comprises transmitting license metadata describing expiration attributes corresponding to the assigned license.

18. A non-transitory computer-readable medium containing computer program code that, when executed by operation of one or more computer processors, performs an operation comprising:
   maintaining, by the network management system, a digital twin comprising a data model that digitally represents the first endpoint device;
   receiving, at a network management system, a request to allocate a license to a first endpoint device;
   selecting a license instance, from a plurality of license instances, to allocate to the first endpoint device, based at least in part on real-time device metadata and state data for the first endpoint device;
   assigning the selected license instance to the first endpoint device comprising setting a value in a digital twin to indicate that a valid license has been assigned to the first endpoint device, wherein the digital twin comprises a digital representation of a current state of the first endpoint device, wherein assigning the selected license instance to the first endpoint device further comprises setting a value in the digital twin representing that a valid license instance has been assigned to the first endpoint device, and
   wherein once the at least an indication that a valid license has been assigned to the first endpoint device is provided to the digital twin, the set value in the digital twin is transmitted to the first endpoint device using a digital twin synchronization process.

* * * * *